Jan. 20, 1970  E. E. FOSTER  3,490,758
VEHICULAR SUSPENSION WITH PRESTRESSED SINGLE PLATE LEAF SPRING
Filed Jan. 12, 1968
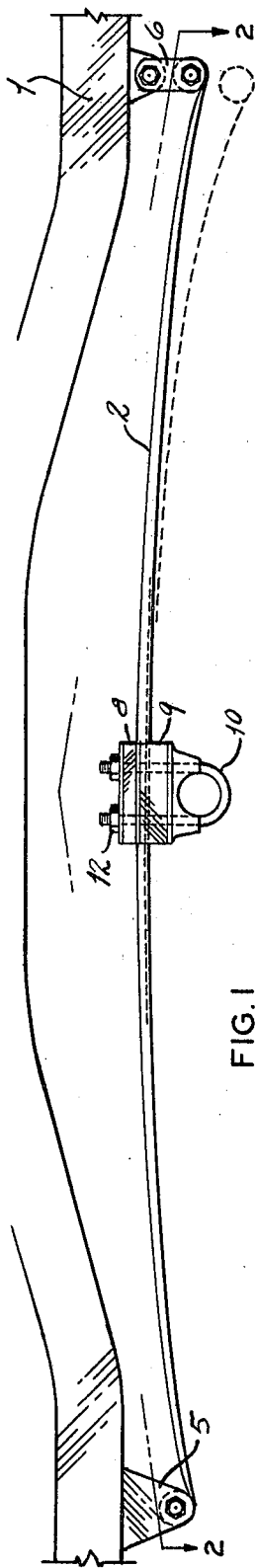
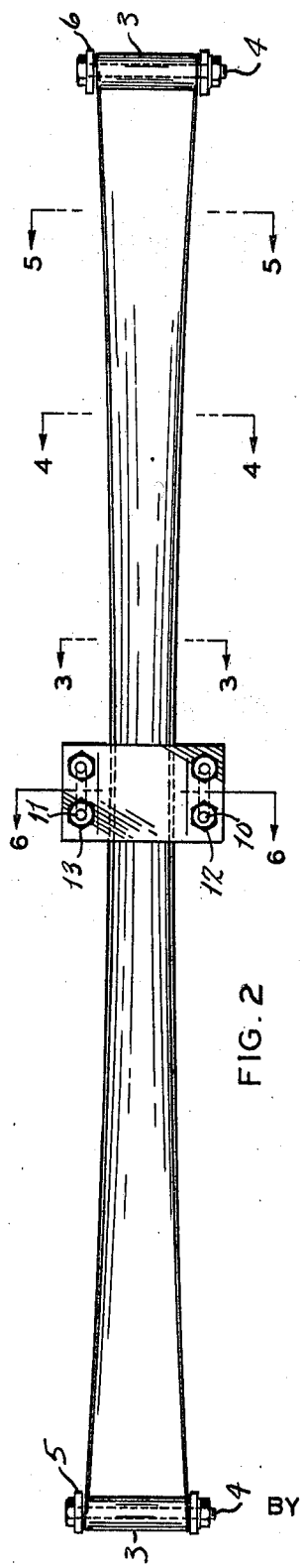
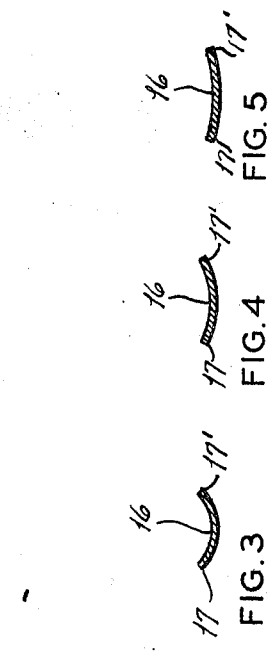
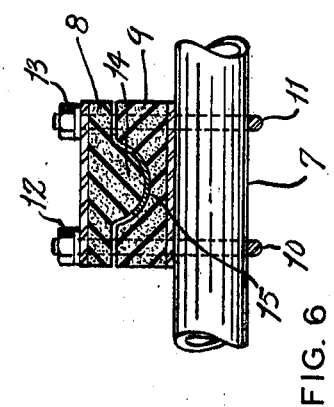
INVENTOR
EDWIN E. FOSTER
BY Ralph W. Kalish
ATTORNEY

United States Patent Office 3,490,758
Patented Jan. 20, 1970

3,490,758
VEHICULAR SUSPENSION WITH PRESTRESSED SINGLE PLATE LEAF SPRING
Edwin E. Foster, 1801 Camp Craft Road,
Austin, Tex. 78746
Filed Jan. 12, 1968, Ser. No. 697,394
Int. Cl. B60q 11/04; F16f 1/30
U.S. Cl. 267—47                 7 Claims

ABSTRACT OF THE DISCLOSURE

An elongated unitary spring for supporting a vehicle frame and being engaged to the vehicle axle; said spring being stressed to provide a cross curvature, when extended, which is additive of, or supplementary to, the natural cross curvature; said spring having its margins stretched and with a longitudinal stressing so as to bias said spring potentially into a coil. The longitudinal stressing is trapped by the cross curvature when the spring is extended or in operative position.

BACKGROUND AND SUMMARY OF THE INVENTION

The primary object of the present invention is to provide a compound curved spring of the type set forth and described in co-pending application, Ser. No. 541,787, and since issued as Patent No. 3,363,891 for supporting a vehicular frame and thereby replacing the half-elliptic leaf springs which have been so widely used heretofore. Such springs as heretofore used are consistently of considerable weight and thus of relatively great expense in manufacture. Additionally, such conventional springs have what might be considered a relatively shore fatigue life.

Therefore, it is a further object of the present invention to provide a unitary spring being suitably stressed, both longitudinally and transversely, so as to efficiently and economically function in operative condition on vehicles.

It is another object of the present invention to provide a vehicular suspension which is of markedly reduced weight with respect to currently used suspension springs with consequent saving in cost of production.

It is a still further object of the present invention to provide a spring of the character stated which will considerably increase the fatigue life of the suspension by reason of the fact that the work is divided between a longitudinal force, a cross curve force, and the stretching of the spring edges with compression of the center.

It is a still further object of the present invention to provide a suspension of the character stated which is economical in production and most durable and reliable in operation.

DESRIPTION OF THE PREFERRED EMBODIMENT

FIGURE 1 is a side view of a vehicular, suspension illustrated in operative position, being constructed in accordance with and embodying the present invention.

FIGURE 2 is a top plan view taken on the line 2—2 of FIGURE 1.

FIGURE 3 is a transverse sectional view taken on the line 3—3 of FIGURE 2.

FIGURE 4 is a transverse sectional view taken on the line 4—4 of FIGURE 2.

FIGURE 5 is a transverse sectional view taken on the line 5—5 of FIGURE 2.

FIGURE 6 is a transverse sectional view taken on the line 6—6 of FIGURE 2.

BRIEF DESCRIPTION OF THE DRAWINGS

Referring now by reference characters to the drawings which illustrate the preferred embodiment of the present invention, 1 designates broadly the frame of a vehicle, such as an automobile, trailer, truck, or the like, and for purposes of illustration only represents the rearward portion of one side of such frame, upwardly of the vehicular rear axle. Engaged to frame 1 for attaching same to the proximate axle, is a suspension comprising an elongated spring 2 of unitary leaf character having "eyes" 3 formed at each end for accommodating conventional anti-friction bushings through which extend bolts 4 whereby the spring may be attached at one of its ends to frame 1 through a rigid boss 5 and at its other end through a spring shackle 6, which latter permits of compensation for changes in the length of spring 2 as the same elongates in compression and shortens upon rebounding.

Substantially centrally of its length, spring 2 may be engaged to the axle housing, shown at 7 in FIGURE 6, by the customary clips, but, preferably, by means of rubber-welded-to-steel brackets 8, 9 which are presented in confronting, cooperating relationship upon axle housing 7 by means of U-bolts 10, 11 extending through suitable openings in said brackets and about said housing 7, with nuts 12, 13, respectively, maintaining said assembly in tight, compact condition. The opposed faces of brackets 8, 9 are provided with corresponding male and female portions 14, 15 respectively, which are convex and concave respectively, and being formed on a radius, the determination of which will be more fully described hereinbelow.

Although not shown or indicated in the drawings, it is to be understood that vehicular suspensions of the present invention are designed to incorporate suitable shock absorbers of any conventional character. However, such absorbers do not form a part of the present invention.

Spring 2 is of the compound curved type being formed in accordance with the manner set forth in my copending patent application Ser. No. 541,787, and since issued as Patent No. 3,363,891 and is, thus, of unitary character having a constant thickness and width, and being constructed from flat stock, such as, particularly, spring steel. The stock is subjected to tensioning devices such as disclosed in U.S. Letters Patent No. 2,609,101 issued Sept. 2, 1952, to produce a residual longitudinal stress for inherently prejudicing spring 2 to form a coil, but the selected stock thickness in combination with the spring cross curvature as set forth below will cause a trapping of the longitudinal stress so that actual coiling will be inhibited. The longitudinal stressing in spring 2 would cause same, if freed from engagement with boss 5 and shackle 6, and fabricated of relatively thinner stock, to coil upon itself in a direction which may be considered counterclockwise should the coil proceed from the right hand side of FIGURE 1, or clockwise if proceeding from the left hand side of FIGURE 1. Stock so treated will, in extended condition, assume a concave-convex cross-section, with the concave side toward the center of the potential coil, because of the normal stresses within the stock, which may be referred to as the natural cross-curvature in that such occurs notwithstanding the fact that the spring is constructed from stock having a substantially flat cross-section.

The stock of spring 2 is also subjected to a banding operation, die-forming, or the like, to produce a concave-convex cross-section which is additive to, or supplementary of, the aforesaid natural cross-curvature. Thus, the concave side will, in an extended length of the spring, be directed toward the center of the potential coil but will be formed on a lesser radius than the natural cross-curvature, such being indicated at 16 in FIGURE 3.

In addition to enhancing the cross-curvature of spring 2, the latter is also treated by a forming operation for the purpose of stretching the edges or marginal portions thereof as at 17, 17'. With spring 2 in extended state, the stretched edges 17, 17' will be normally in tension, with the intervening portions in compression (FIGURE 3). It will be appreciated that with the edges of the spring stock being stretched beyond their elastic limit, a resultant cross-curvature bias of spring 2 is developed so that should spring 2 coil a cross-curve will be presented, having the convex side toward the center of the coil and which bias will cause the spring when extended to move to a condition wherein the concave side would be directed toward the center of the coil.

In order to treat the spring stock for rendering same effective for vehicular suspension systems, the same is longitudinally stressed for inherent self-bias coiling; is provided with a formed cross-curvature in addition to the natural cross-curvature and in the same direction; and is stretched at its edges. Spring 2 is thereupon brought into extended state for engagement at its ends to boss 5 and shackle 6 as above described so that the normal bias of spring 2 will urge frame 1 upwardly of the proximate axle. The central portion of spring 2 will be clamped between resilient brackets 8, 9 which will accommodate the resultant maximum cross-curvature, as indicated at 16 in FIGURES 3 and 6. As the points of securement of spring 2 to boss 5 and shackle 16 are normally downwardly of the engaged portion of spring 2 with the brackets 8, 9, spring 2 is thereby subjected to what might be considered a back-wound direction at its ends which will thus tend to effect a gradual flattening, as it were, of the cross-curvature of spring 2 from the bracket-receiving portion toward the opposite ends. As shown in FIGURES 1 to 5, inclusive, wherein spring 2 is in unloaded condition, the relatively decreasing radius of the cross-curvature in progressing toward the spring ends is apparent.

This graduation in the extent of cross-curvature of spring 2 is for the purpose of spreading the flexing of said spring 2 over its entire length. It will be recognized, however, that the flattening of spring 2, or the reduction in radius of cross-curvature, involves a storing or taking of energy which is requisite to cause the stretched edges 17, 17' to be forced into such state.

It will thus be seen that upon subjection of spring 2 to the stresses encountered during operation of the related vehicle, as upon loading, frame 1 is caused to move downwardly in a direction toward the proximate axle thereby causing the end portion of spring 2 to be moved further downwardly with relation to the axle as may best be indicated in dotted lines at the right hand side of FIGURE 1. Such loading provides enhanced backwinding force, as it were, upon spring 2 with corresponding flattening of the cross-curvature of spring 2 so that a substantial stressing or taking of energy is brought about through such depression of the cross-curvature thereof. The elastic character of brackets 8 and 9 will permit the center portion of spring 2 to also flatten slightly under the applied load.

By the unique enhanced properties of spring 2 a most substantial force or stresss must be applied thereto to overcome the resistance of the combination of the cross-curvatures and the edge stretching so as to bring about a flattening of said spring. Spring 2 has a relatively high rate whereby deflection is brought about through the application of considerable weight causing spring 2 to function in a more efficient manner than the customary half-elliptic leaf spring utilized in vehicles.

The energy stored in spring 2 during loading is available for release during unloading whereby spring 2 will be caused to assume its upwardly concave condition as shown in FIGURE 2. The marginally stretched portions of spring 2 which are normally under tension conduce substantially to the capability of spring 2 in giving or releasing and storing or taking of energy so that the power of spring 2 is not determined solely by longitudinal force but by such force together with the above described transverse forces which latter endow spring 2 with enhanced power through the stiffening brought about by the development of a relatively deep concave-convex cross-curvature.

In view of the foregoing, it is apparent that the spring of the present invention is uniquely adapted to accommodate the stresses applied during vehicular operation and to present the elasticity requisite for vehicular suspension systems.

It should be understood that changes and modifications in the formation, construction, arrangement, and combination of the several parts of the vehicular suspension may be made and substituted for these herein shown and described without departing from the nature and principle of my invention.

Having thus described my invention, what I claim and desire to obtain by Letters Patent is:

1. In combination with a vehicular frame, a vehicular suspension comprising a unitary elongated body fabricated of spring stock, means engaging each end of said body to said frame in dependency therefrom, there being an axle disposed beneath said frame, means engaging the central portion of said body on said axle, said body having a longitudinal stress for normally biasing said body into a coil, said body further having a transverse stress to provide a cross-curvature greater than the normal cross-curvature of the body when under load.

2. In combination with a vehicular frame, a vehicular suspension as defined in claim 1 and further characterized by said body having stretched lateral margins so that in unloaded condition such marginal portions will be under tension with the intervening portions being under compression.

3. In combination with a vehicular frame, a vehicular suspension as defined in claim 2 and further characterized by the means for mounting said suspension on said frame engaging the ends of said body at points below the point of engagement of the central portion of said body with said axle whereby the cross curvature of said body in unloaded condition will be of decreasing radius toward the ends of said body.

4. In combination with a vehicular frame, a vehicular suspension as defined in claim 1 and further characterized by the cross curvature of said body being upwardly concave when in unloaded condition.

5. In combination with a vehicular frame, a vehicular suspension as defined in claim 1 and further characterized by said axle engaging means comprising cooperating resilient members for sandwiching therebetween of the body so as to allow for a relative flattening of the cross curvature of the latter during loading.

6. In combination with a vehicular frame, a vehicular suspension comprising a unitary elongate body fabricated of spring stock, means engaging each end of said body to said frame in dependency therefrom, there being an axle disposed beneath said frame, means engaging the central portion of said body on said axle, said body having a longitudinally stress normally urging said spring into a coil, said body having a natural concave-convex cross section when in extended position, said body further having a formed cross-curvature which is in the same direction as, and supplementary of, said natural concave-convex cross section, said body also having edge portions stretched beyond their elastic limit for causing cross curvature greater than the natural cross curvature of said body for resisting the normal bias for forming said body into a coil.

7. The invention as defined in claim 6 and further characterized by said means engaging the central portion of said body on said axle comprising brackets, the opposed faces of said brackets having opposed convex and concave faces, the central portion of said body being clamped between said brackets so that the transverse curvature of said body is presented with its convex face facing said axle.

References Cited

UNITED STATES PATENTS

| | | | |
|---|---|---|---|
| 1,628,561 | 5/1927 | Smith | 267—44 |
| 2,648,895 | 8/1953 | Davis. | |
| 2,762,445 | 9/1956 | Polhemus et al. | 267—47 X |

A. HARRY LEVY, Primary Examiner

U.S. Cl. X.R.

29—173; 267—158; 280—124